United States Patent
Walsh et al.

(10) Patent No.: US 6,480,072 B1
(45) Date of Patent: Nov. 12, 2002

(54) METHOD AND APPARATUS FOR GENERATING RANDOM NUMBERS

(75) Inventors: James J. Walsh, Austin, TX (US); Randall Paul Biesterfeldt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/551,109

(22) Filed: Apr. 18, 2000

(51) Int. Cl.$^7$ ............................................... H03B 29/00
(52) U.S. Cl. ............................ 331/78; 331/57; 331/46; 708/250; 708/251; 708/252
(58) Field of Search ............................. 708/251, 250, 708/252; 331/78, 57, 46

(56) References Cited

U.S. PATENT DOCUMENTS

| | | |
|---|---|---|
| 4,694,412 A | 9/1987 | Domenik et al. ............ 364/717 |
| 4,810,975 A | 3/1989 | Dias ............................ 331/78 |
| 4,905,176 A | 2/1990 | Schulz ........................ 364/717 |
| 5,007,087 A | 4/1991 | Bernstein et al. ............ 380/46 |
| 5,706,218 A | 1/1998 | Hoffman ..................... 364/717 |
| 5,961,577 A | 10/1999 | Soenen et al. .............. 708/251 |
| 5,963,104 A | 10/1999 | Buer ........................... 331/78 |

FOREIGN PATENT DOCUMENTS

EP 0 095 272 A1 11/1983

OTHER PUBLICATIONS

Jun and Kocher, "The Intel® Random Number Generator", Cryptography Research, Inc. White Paper Prepared for Intel Corporation, Apr. 22, 1999, pp. 1–8.

Fairfield, Mortenson, et al., "An LSI Random Number Generator (RNG)", *Advances in Cryptology: Proceedings of CRYPTO 84*, Springer–Verlag, 1985, pp. 203–230.

Schneier, "Protocols, Algorithms, and Source Code in C", Applied Cryptography, 1996, pp. 423, 678, and 697.

*Primary Examiner*—Arnold Kinkead
(74) *Attorney, Agent, or Firm*—Zagorin, O'Brien & Graham, LLP

(57) ABSTRACT

A random number generator generates high quality random numbers by sampling the output of a voltage controlled oscillator (VCO) at a frequency much lower than the frequency of the oscillator output. The output frequency of the oscillator is changed significantly during each sampling interval to help ensure the phase relationship of the VCO output and the sampling frequency is unpredictable. That may be accomplished by logically combing the sampling clock and an output from a linear feedback shift register in an exclusive OR gate and supplying that output as the most significant bit used to generate the voltage to control the oscillator. Additional outputs from the linear feedback shift register are also used to generate the control input to the VCO. A distilling circuit such as a CRC circuit or a linear feedback shift register shifts in successive output samples and generates a number therefrom to further increase the randomness of the generated random number.

45 Claims, 5 Drawing Sheets

METHOD AND APPARATUS FOR GENERATING RANDOM NUMBERS

BACKGROUND OF THE INVENTION

1. Field of the Invention

This invention relates to generating random numbers and more specifically to generating random numbers using an oscillator having a variable output frequency.

2. Description of the Related Art

Random numbers are used in various encryption applications, which are particularly important in providing security for e-commerce applications as well as for a wide variety of other computer based or internet based communications and transactions.

One approach to generating random numbers uses ring oscillators. In one approach using ring oscillators, a free running ring oscillator is used to clock a linear feedback shift register (LFSR). In another random number generator a single, slow voltage controller oscillator (VCO), which receives a noise input, samples the output of high speed ring oscillators.

One problem with some ring oscillators based random number generators, is that the sample frequency may be correlated to the ring oscillator frequency for a duration long enough to cause individual random number generator bits to be correlated and therefore, less random.

It would be desirable to provide a random number generator that reduces or eliminates that correlation and produces random numbers that are more unpredictably random.

SUMMARY OF THE INVENTION

Accordingly, the invention utilizes an oscillator in an open loop configuration, such as a voltage controlled oscillator (VCO), whose output frequency is randomly controlled. The VCO output signal is sampled at a frequency much lower than and asynchronous to the frequency of the VCO output signal. The frequency of the VCO output signal is made to change significantly during each sample period. Due to the asynchronous relationship between the VCO output signal and the sample clock and the significant change in frequency during the sampling period, the exact number of VCO output periods, including any fractional parts, varies during each sample period. That variation is the basis for creating unpredictable randomness.

In one embodiment, the random number generator includes an oscillator supplying an oscillator output signal having a frequency determined according to a control input. A sampling circuit, coupled to the oscillator, samples the oscillator output signal using a sample clock at a sampling frequency that is asynchronous to and lower than the frequency of the oscillator output signal. The control input to the oscillator is used to cause the oscillator output frequency to change significantly within each sample period.

The random number generator may further include an exclusive OR circuit coupled to provide a signal used in generating the control input for the oscillator, the output from the exclusive OR gate changing within each sample period thereby causing the oscillator output frequency to change significantly within each sample period.

The random number generator may use the sample clock to generate, at least in part, the control input for the oscillator. Because the sample clock changes values within each sample period, the oscillator output frequency changes within each sample period.

The random number generator may also include a linear feedback shift register whose outputs are coupled to generate at least, in part, the control input to the oscillator. One of the outputs of the linear feedback shift register is provided to an exclusive OR circuit, which supplies one of the signals (preferably the most significant bit) used to generate the control input to the oscillator. The oscillator also receives a clock signal such as the sampling clock, thereby ensuring that the oscillator output signal changes significantly during each sampling period.

The random number generator may further include a distilling circuit coupled to the sampling circuit.

In another embodiment, the invention provides a method of supplying an oscillator output signal having a frequency determined according to a control input. A sampling circuit samples the oscillator output signal using a sampling clock at a sampling frequency lower than and asynchronous to the frequency of the oscillator output signal and supplies a sampled output signal. The oscillator output frequency is changed significantly during each sampling interval using the control input.

The method may further include shifting the sampled output signal into a linear feedback shift register, generating pseudo random numbers in the linear feedback shift register and generating the control input using the pseudo random numbers.

The method may further include logically combining one of the outputs of the linear feedback shift register and the sample clock signal in an exclusive OR circuit and providing an output from the exclusive OR circuit to generate, at least in part, the control input, to ensure that the output frequency of the oscillator changes greatly during the sample period.

The method may further include shifting successive outputs from the sampling circuit into a distilling circuit to generate an N bit random number.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
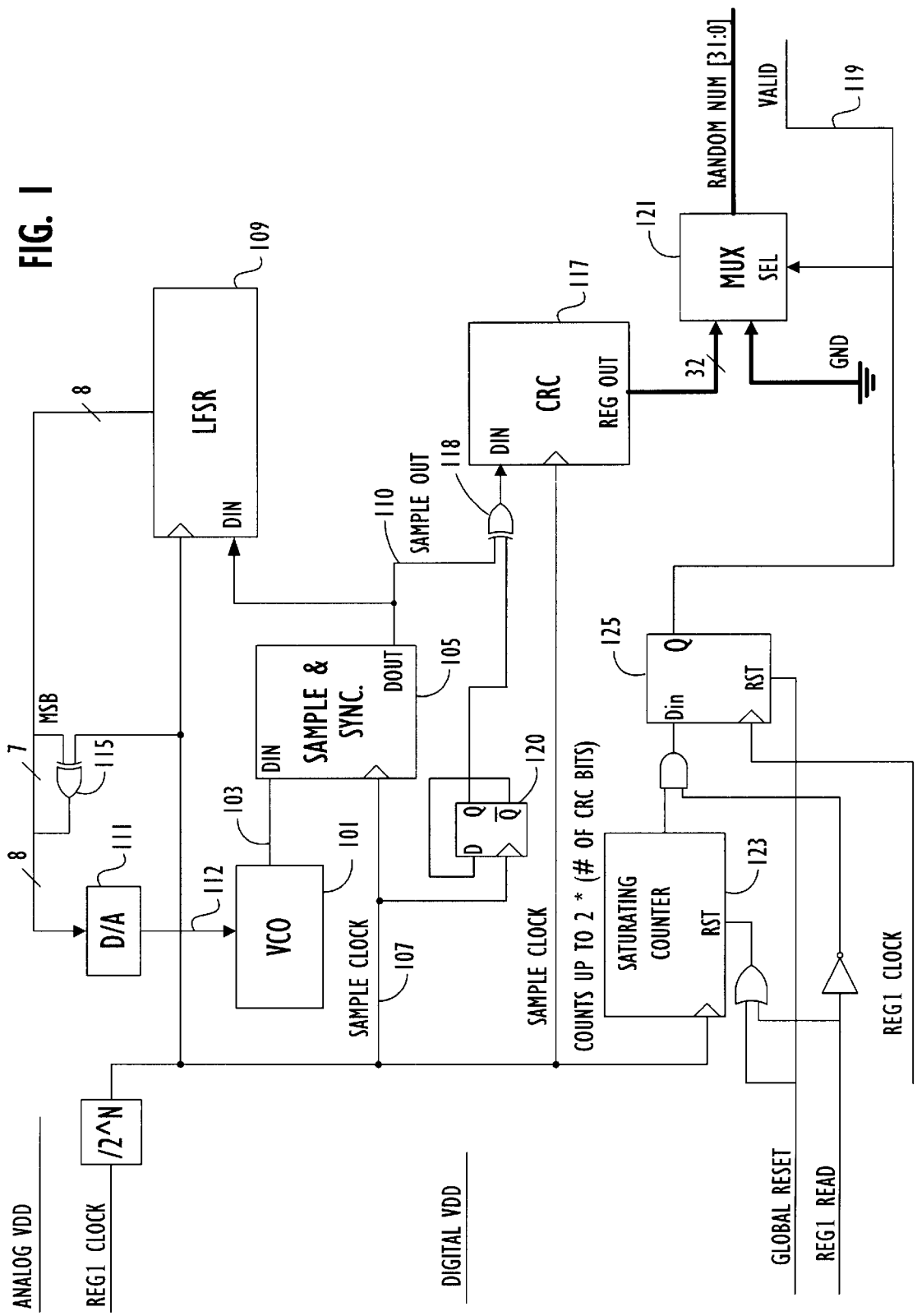
FIG. 1 depicts one embodiment of the invention using a VCO and a linear feedback shift register.

Referring to FIG. 1, one embodiment of the invention is depicted in which voltage controlled oscillator (VCO) 101 generates output signal 103, which is sampled by sample circuit 105. Sample circuit 105 may be, e.g., a register or flip-flop. Sample circuit 105 samples the VCO output signal at a sampling rate determined by sample clock 107. The frequency of sample clock 107 is much lower (e.g. orders of magnitude) than and asynchronous to, the output frequency of VCO 101. For example, sample clock 107 may operate at 1.07 MHz as compared to a VCO output frequency of 1 GHz. That ensures that a small change in VCO output frequency results in a major change in phase of the VCO output with respect to the sample clock. For example, if the VCO output is 1 GHz and the sample rate is 1 MHz, then a 0.1% change in frequency on the VCO output will cause a phase change of approximately one VCO clock period.

In one preferred embodiment, linear feedback shift register 109 in conjunction with exclusive OR gate 115 is used to control the output frequency of VCO 101. Linear feedback shift register 109 shifts in output 110 from sample circuit 105. The VCO output frequency is changed randomly, with uniform distribution, between each sample using pseudo random numbers generated by linear feedback shift register to control the output frequency. Linear feedback shift register 109 may be implemented, e.g., as an 8 bit linear feedback shift register. In the embodiment shown in FIG. 1, linear feedback shift register 109 is clocked by sample clock 107.

Because a voltage controlled oscillator is being used in the described embodiment, the digital outputs from linear feedback shift register 109 and exclusive OR gate 115 are provided to digital to analog converter (D/A) 111. Digital to analog converter 111 receives the digital signals, converts them to analog signals and supplies analog voltage 112 as the control input to control the output frequency of VCO 101. In order to ensure that the VCO output is changed greatly over the duration of each sample period, exclusive OR gate 115 logically combines the most significant bit (MSB) used to control the voltage with sample clock 107. The output of exclusive OR gate 115 changes during the middle of the sample clock period when the sample clock changes. Assuming the sample clock has a 50% duty cycle, the change occurs in the middle of the sample clock period. Because the most significant bit being used in the D/A conversion is being toggled during the sampling period, the output frequency of the VCO changes significantly within the frequency range of the VCO during the sampling period. Bits other than the MSB may be used but that causes less significant changes in VCO output frequency.

In another embodiment (not shown), the sample clock may be provided directly to D/A 111 as the most significant bit, rather than through exclusive OR gate 115. That ensures that the VCO output frequency changes greatly during the sample period.

The unpredictability of the randomness is achieved by a combination of several factors. As long as the VCO output frequency is made to vary significantly during the sampling period, by coupling the control inputs of the VCO such that the control voltage varies significantly over the input voltage range of the VCO during the sample period, the output of the VCO will vary randomly during the sampling period, e.g., between 999 and 1001 output periods per sampling period. Factors such as power supply noise, process, voltage and temperature changes, chip fatigue (aging) over time and additional factors described herein contribute to the randomness in the number of VCO periods generated during each sample period.

The unpredictability is accomplished principally due to the phase difference between the sample clock and the VCO output being unpredictably random. That phase difference is manifested in the number of VCO output periods (including fractional parts) that occur during each sample clock period. For example, for one specific range of VCO output frequency the number of VCO output periods in the sample clock period varies between 999.1 and 1001.7 clocks. That unpredictability is achieved, at least in part, by ensuring the frequency changes significantly during the sample period using exclusive OR circuit 115 as well as linear feedback shift register 109.

In addition, at the beginning of each random number generation process, the phase of the VCO output with respect to the sample clock is unpredictably random because the phase is dependent upon on all the past history of the VCO state, starting from initial power up. The VCO integrates phase over time. At startup, the VCO is designed to be free running and has no relationship to the sample clock. That is, the VCO is not initialized on power up so the initial phase of the VCO is random with respect to the sample clock. Therefore, VCO state history from power up to any given time is unrepeatable, which further contributes to VCO output phase, with respect to the sample clock, being unpredictably random.

Unpredictability of output phase with respect to the sample clock is further enhanced because the VCO is implemented in an open loop configuration and thus the output frequency drifts over time due to changes in temperature, voltage, stray capacitance and aging. That is, the output frequency will not stay exactly the same over time for the same input voltage. In other VCO applications, the VCO is part of a closed loop control system so that the output is maintained at a constant phase and frequency, as, for example, in the case of a phased locked loop. The fact that the VCO utilized in the random number generator described herein is implemented in an open loop control configuration further adds to the unpredictability of the random number output. The number of VCO output periods that occur between each sample clock rising edge (sample point) is in part made unpredictably random, within a specific range, because the VCO output frequency, for a given input voltage, will not be exactly the same for multiple independent occurrences of the input control voltage.

Statistical randomness is enhanced by distilling the random output from sampling circuit 105 by using a distilling circuit such as a circuit implementing a cyclic redundancy check (CRC) process. As shown in FIG. 1, CRC circuit 117 receives the sampled output 110 from sample circuit 105. In the embodiment shown, CRC circuit 117 provides a 32 bit CRC generation process. CRC circuit 117 shifts in 64 sample output bits before the CRC result is made available external to the random number generator in order in order to distill the results. The distillation circuit "boils down" an output to fewer bits (e.g., 64 to 32) with the objective of reducing the amount of non-random information. The randomness of 64 bits is combined into a 32 bit result, as opposed to generating a 32 bit result by shifting in only 32 bits, thus improving statistical randomness.

Other distillation methods may also be used. For example, instead of a 32 bit CRC generator, a Galois linear feedback shift register may be used to distill the output from sample circuit 105. CRC circuits and linear feedback shift registers are well known in the art and are therefore not further described herein.

Figure 8:
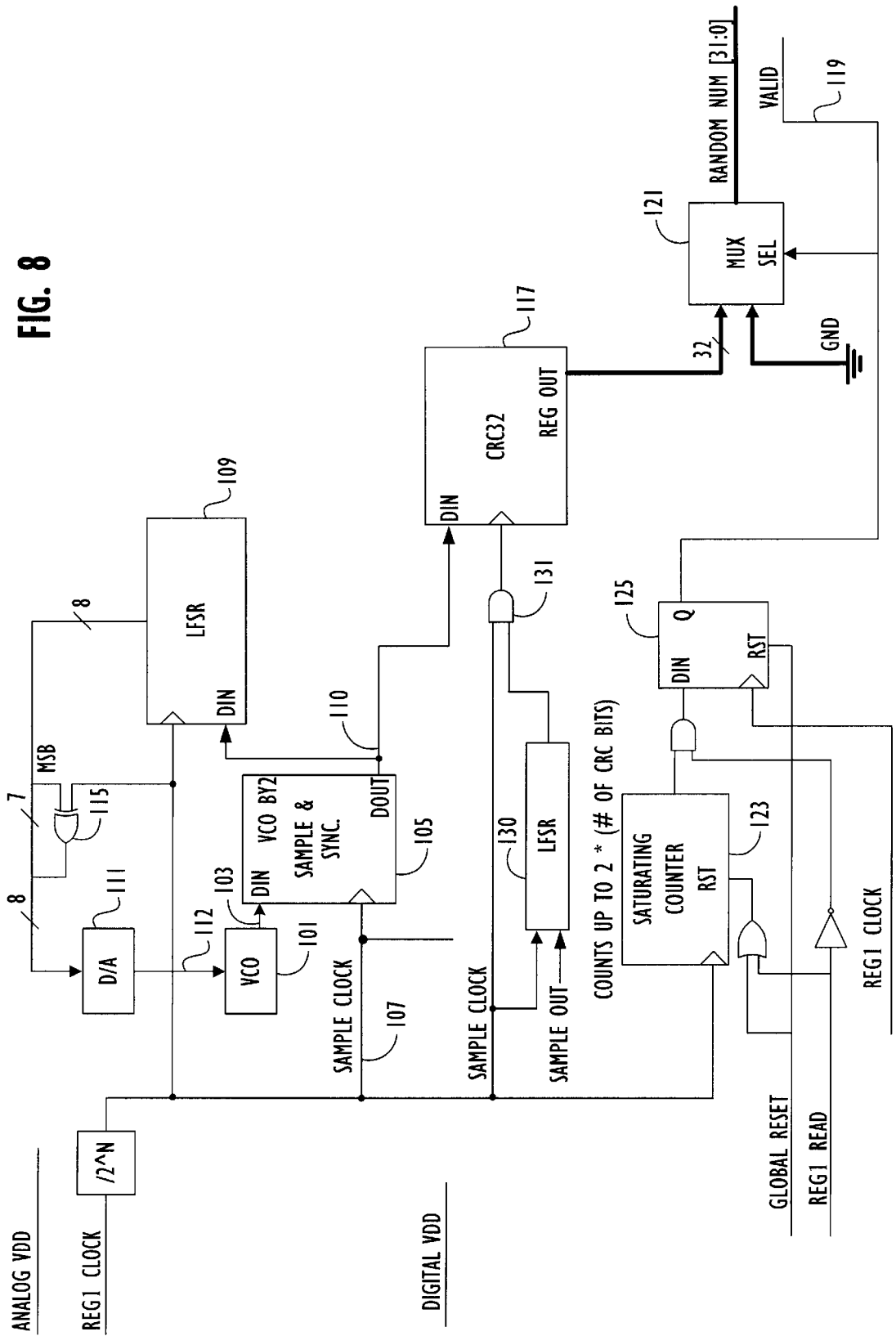

The sampled output 110 in a preferred embodiment, is provided to the distilling circuit 117 through exclusive OR gate 118. Exclusive OR gate 118 helps to remove any bias towards 1's or 0's that was present in the sampled output. Exclusive OR gate 118 combines the sampled output and an output from flip-flop 120, which is the sample clock divided by two. In other embodiments, exclusive OR gate 118 may be omitted and the sampled output 110 supplied directly to distilling circuit 117, as shown in FIG. 8.

Figure 2:
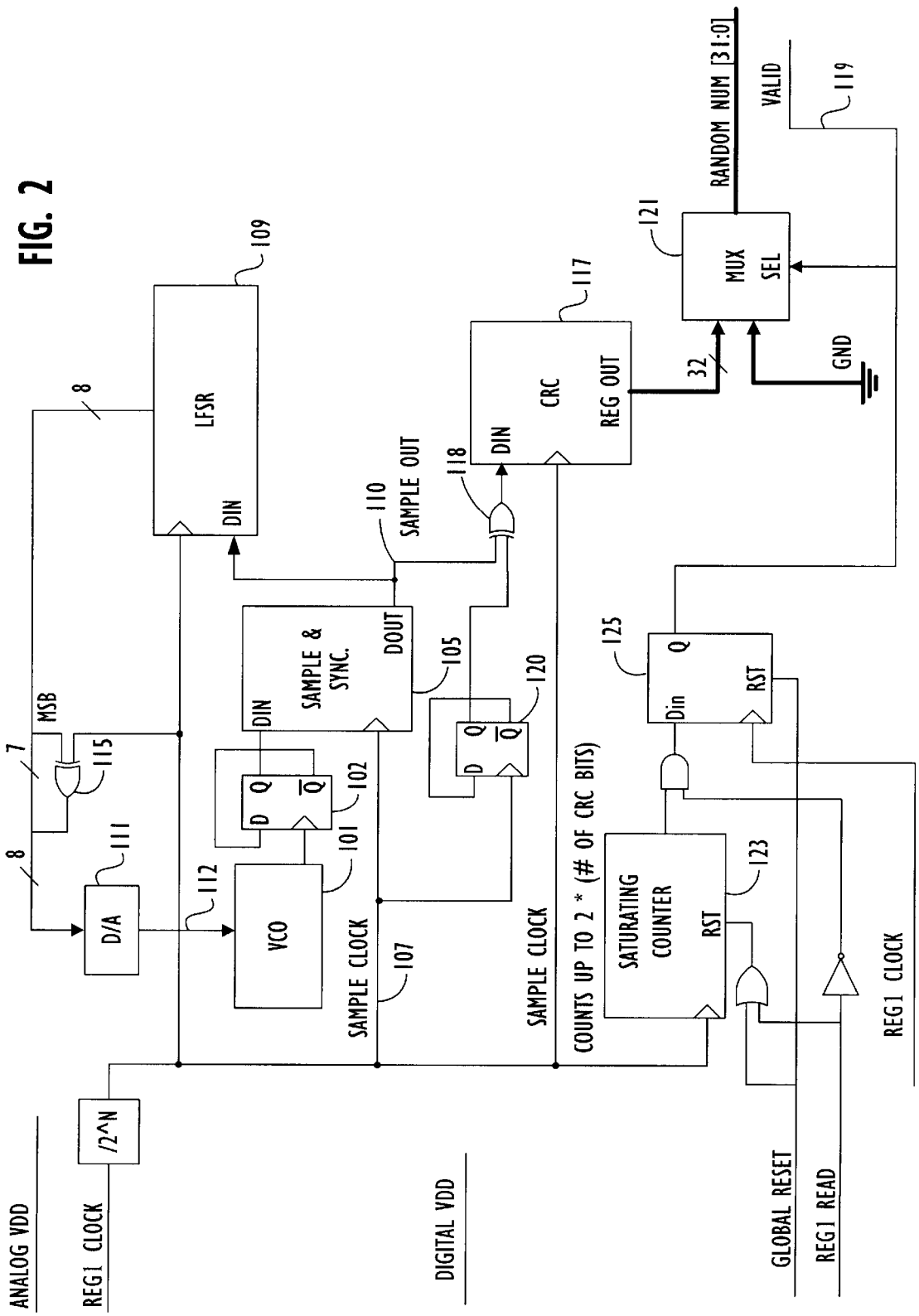
FIG. 2 depicts another embodiment of the invention using a VCO and a linear feedback shift register in which any duty cycle aberrations of the VCO are eliminated using a toggle flip flop.

If the duty cycle of the VCO is not 50%, a bias towards ones or zeros will be present in the sample values. Accordingly, in an embodiment shown in FIG. 2, a toggle flip-flop 102 divides the output of the VCO by two and provides a 50% duty cycle output to be sampled by sample circuit 105.

For security reasons, observations of intermediate outputs from the random number generator may be prevented. Valid signal 119, indicates the validity of the random number output from CRC 117. Valid signal 119 causes multiplexer 121 to select either all 0's or the random number output from CRC 117, thereby hiding the CRC output result unless the valid signal is asserted. The valid signal 119 is generated by saturating counter 123 which counts up to, e.g., twice the number of bits generated by CRC 117. For example, counter 123 may count 64 bits—the number of bits boiled down by the distilling circuit. The sample clock 107 clocks counter 123 so the counter counts the number of bits shifted into CRC 117. Once 64 bits are shifted in, counter 123 saturates and an overflow indication is clocked into flip flop 125 which drives valid signal 119.

In the embodiment illustrated in FIG. 1, the random number from multiplexer 121 is read into a register (not shown) using the REG1 clock. The read strobe is REG1 READ. Anytime the read strobe is asserted, the saturating counter is reset and multiplexer 121 will select zeros rather than the CRC output for another 64 sample clocks (assuming the CRC is shifting in 64 bits). In that way, security is further enhanced by limiting observations of intermediate results.

The embodiment illustrated in FIG. 1 may be modified to increase the unpredictability of the random number generator. For example, the random number generator shown in FIG. 1 may be modified to clock linear feedback shift register 109 with a clock that has one or more of the following characteristics: the clock may be asynchronous to sample clock 107, the clock may have a higher or lower frequency than sample clock 107 or the clock may have a period that is relatively prime with respect to the period of sample clock 107. Relatively prime implies that for two clocks A and B, there will be no periodicity (no recurring sub patterns) between them until the A * B period. In addition, linear feedback shift register 109 may be clocked with an aperiodic waveform, such as sample clock 107, that is modified to additionally clock linear feedback shift register 109 aperiodically, such as when a key is pressed on the keyboard or a mouse is moved (i.e., when a keyboard or mouse interrupt is generated).

The circuits shown in FIG. 1 may also be modified such that the combined transient response times of D/A 111 and VCO 101 are on the same order of magnitude as the sample clock period. That helps increase unpredictable random behavior of the random number generator because the transient response is not exactly the same for multiple independent recreations of digital to analog input sequences, given constant operating conditions. That may be accomplished by varying the relative frequencies of the sample clocks and the VCO output. Alternatively, the transient response may be adjusted by filtering the input or output of D/A 111. For example, a simple RC filter may be placed on the outputs of the D/A so that the time constant of the RC filter and the combined transient response times of D/A 111 and VCO matches the period of the sample clock. Other more complicated filters may of course be utilized.

Figure 3:
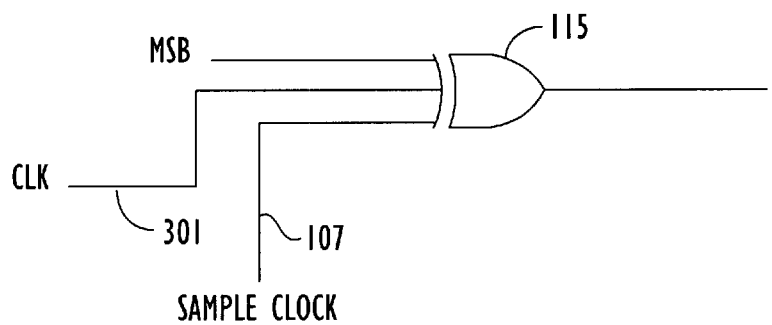
FIG. 3 depicts an embodiment in which a signal from the linear feedback shift register that is used as a control signal for the VCO is logically combined in an exclusive OR circuit with clock signals that are asynchronous to one another.

In another embodiment of the random number generator, exclusive OR gate 115 may be modified to cause the VCO phase change between sample points to be more unpredictable. Referring to FIG. 3, that may be accomplished by modifying exclusive OR gate 115 to include a clock input 301, which is asynchronous to sample clock 107. Clock input 301 may be relatively prime with respect to sample clock 107.

Figure 4:
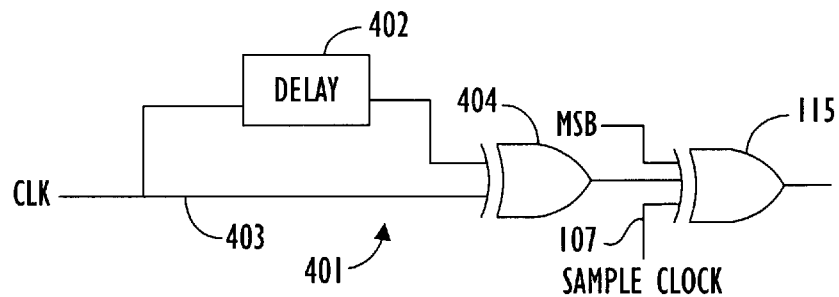
FIG. 4 depicts an embodiment in which a signal from the linear feedback shift register that is used as a control signal for the VCO is logically combined in an exclusive OR circuit with a pulse signal.

In another embodiment shown in FIG. 4, exclusive OR gate 115 may be modified receive the output of pulse circuit 401, which generates a short pulse, e.g., 5 ns, whenever one of its inputs changes. The pulse circuit may be implemented as an exclusive OR gate that receives one of the clocks described previously (e.g., asynchronous, prime, aperiodic) and receives an output from a 5 ns delay cell 402 that provides a delayed version of clock signal 403. Whenever clock signal 403 changes, a 5 ns pulse is generated.

In another embodiment, the pulse circuit 401 may have as its input another entropy source, rather than clock 403, such as a PC system's keyboard interrupt request signal (not shown).

Figure 5:
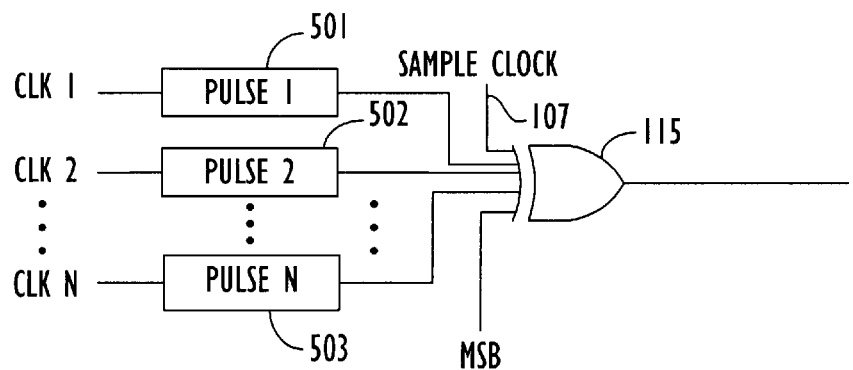
FIG. 5 depicts an embodiment in which a signal from the linear feedback shift register that is used as a control signal for the VCO is logically combined in an exclusive OR gate with a plurality of pulse signals.

In still another embodiment, as shown in FIG. 5, exclusive OR gate 115 receives outputs from a plurality of pulse generation circuits 501, 502 and 503. Each of the pulse circuits receives a clock having a different frequency. In an exemplary personal computer (PC) incorporating such an embodiment, one of the clocks may be a 32.768 KHz clock, another clock may be a 14.318 MHz clock (divided down to be less than the sample clock) and another clock may be a clock of 12.288 MHz divided down to be less than the sample clock frequency.

The sample clock, which is shown as an input to exclusive OR gate 115 in FIGS. 3–5 is not required but is helpful.

Figure 6:
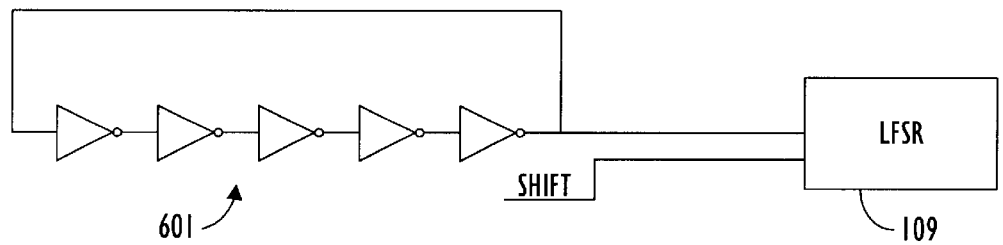
FIG. 6 depicts an embodiment in which a ring oscillator supplies a signal to a linear feedback shift register that supplies the control signals for the VCO.

In another embodiment shown in FIG. 6, linear feedback shift register 109 is modified to include an additional input from ring oscillator 601. The input from ring oscillator 601 is logically combined in one of the exclusive OR gates that form the generator polynomial for linear feedback shift register 109.

Figure 7:
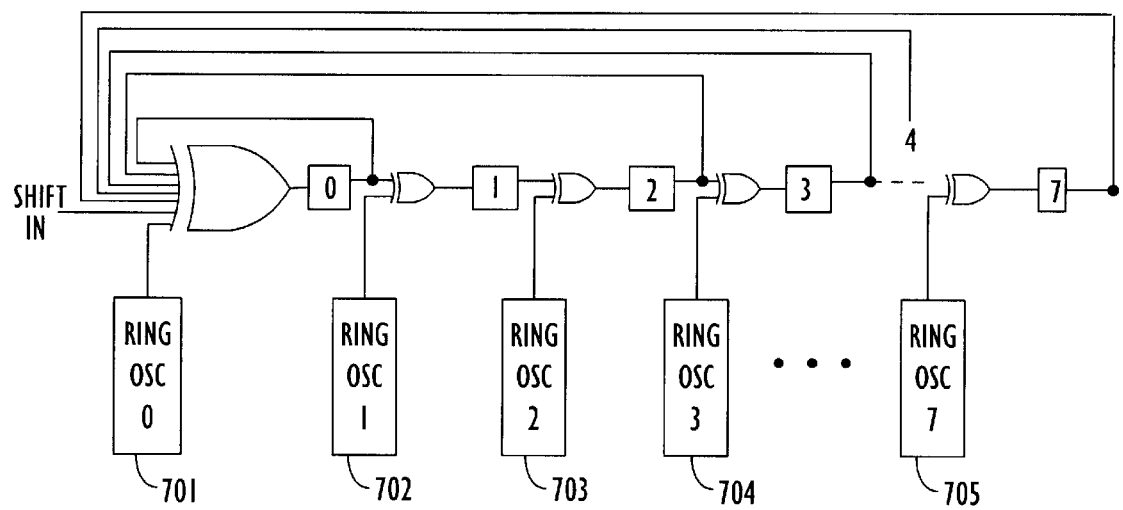
FIG. 7 depicts an embodiment in which a plurality of ring oscillators supply signals to the linear feedback shift register that supplies the control signals for the FIG. 8 depicts an embodiment in which a second linear feedback shift register is used to randomly enable and disable samples being shifted into the CRC process.

In another embodiment illustrated in FIG. 7, a plurality of N ring oscillators 701–705, each of independent and different frequency, are provided to each respective element of the linear feedback shift register. For each element of the linear feedback shift register, an exclusive OR gate is inserted before its data input. One of the data inputs to each of the exclusive OR gates is from a respective one of the ring oscillators.

Referring again to FIG. 1, the embodiments described herein may shift more than 64 bits into the randomizer circuit implemented as CRC generator 117 or as a linear feedback shift register before the random number is made visible external to the random number generator. In fact, the number of bits shifted into the randomizer circuit used for distilling the sampled output before the result is made available external to the random number generator may be randomized. For example, the number of bits shifted into a linear feedback shift register used as the randomizer circuit may be 64 plus the output of a 6 bit Galois linear feedback shift register, which causes the number of bits shifted to vary between 65 and 128.

In addition to various circuits that may be implemented for distilling circuit 117, the approach used to generate random control values for VCO 101 may vary. For example, linear feedback shift register 109 may be implemented as a 16 bit Galois linear feedback shift register rather than an 8 bit linear feedback shift register.

In still another embodiment, as illustrated in FIG. 8, a second linear feedback shift register 130 is used to provide an output that is logically combined with sample clock 107 in AND gate 131 to randomly enable and disable samples being shifted into the distillation process from sample circuit 105. Linear feedback shift register 130 may be supplied with sample output 110 as its serial input.

Thus, an improved random number generator circuit has been described. The description of the invention set forth herein is illustrative, and is not intended to limit the scope of the invention set forth in the claims. For instance, the various modifications to FIG. 1 may be combined in different combinations, not specifically shown or described, to increase the unpredictable randomness and/or the statistical randomness provided by the various random number generators described herein. In addition, while a voltage controlled oscillator has been described herein, any oscillator whose output frequency can be randomly controlled is suitable. For example, the oscillator can be a numeric controlled oscillator, and thus a separate digital to analog converter may not be required in every embodiment. In addition a current controlled oscillator could be used. Note that there is no requirement that the oscillator output be linear. Other variations and modifications of the embodiments disclosed herein, may be made based on the description set forth herein, without departing from the scope and spirit of the invention as set forth in the following claims.

What is claimed is:

1. A random number generator comprising:

an oscillator supplying an oscillator output signal having a frequency determined according to a control input;

a sampling circuit coupled to the oscillator to sample the oscillator output signal, using a sample clock at a sampling frequency that is asynchronous to and lower than the frequency of the oscillator output signal;

wherein the control input is coupled to cause the oscillator output frequency to change significantly within each sample period of the sample clock; and wherein the oscillator is one of a numeric controlled, voltage controlled and current controlled oscillator; and further comprising an exclusive OR circuit coupled to provide a signal used in generating the control input for the oscillator, an output from the exclusive OR gate changing within each sample period, thereby causing the oscillator output frequency to change significantly within each sample period.

2. A random number generator comprising:

an oscillator supplying an oscillator output signal having a frequency determined according to a control input;

a sampling circuit coupled to the oscillator to sample the oscillator output signal, using a sample clock at a sampling frequency that is asynchronous to and lower than the frequency of the oscillator output signal;

wherein the control input is coupled to cause the oscillator output frequency to change significantly within each sample period of the sample clock; and wherein the oscillator is one of a numeric controlled, voltage controlled and current controlled oscillator; and wherein the sample clock is coupled to generate, at least in part, the control input for the oscillator, the sample clock changing values within each sample period, thereby causing the oscillator output frequency to change significantly within each sample period.

3. A random number generator comprising:

an oscillator supplying an oscillator output signal having a frequency determined according to a control input;

a sampling circuit coupled to the oscillator to sample the oscillator output signal, using a sample clock at a sampling frequency that is asynchronous to and lower than the frequency of the oscillator output signal;

a linear feedback shift register whose outputs are coupled to generate at least, in part, the control input; and wherein the control input is coupled to cause the oscillator output frequency to change significantly within each sample period of the sample clock.

4. The random number generator as recited in claim 3 further comprising an exclusive OR circuit coupled between the linear feedback shift register and the oscillator, the exclusive OR circuit being coupled to receive one of the linear feedback shift register outputs and to supply one of the signals used to generate the control input to the oscillator.

5. The random number generator as recited in claim 4 wherein the one of the signals supplied from the exclusive OR circuit is a most significant bit used to generate the control signal, thereby providing that the oscillator output signal is changed significantly during each sample period.

6. The random number generator as recited in claim 4 wherein the exclusive OR circuit logically combines the sample clock and the one of the linear feedback shift register outputs to provide the most significant bit used to generate the control input.

7. The random number generator as recited in claim 6 wherein the exclusive OR circuit further receives a second clock signal that is asynchronous to the sample clock.

8. The random number generator as recited in claim 6 wherein the exclusive OR circuit further receives a clock whose period is relatively prime with respect to the sample clock.

9. The random number generator as recited in claim 6 further comprising a pulse circuit generating a pulse signal coupled as an input to the exclusive OR circuit, the pulse circuit generating the pulse signal whenever an input to the pulse circuit changes.

10. The random number generator as recited in claim 9 wherein the pulse circuit receives a clock signal as an input, the clock signal being different from a clock used to clock the linear feedback shifter register clock signal.

11. The random number generator as recited in claim 9 wherein the pulse circuit receives an aperiodic signal as an input.

12. The random number generator as recited in claim 6 further comprising a plurality of pulse circuits generating a respective plurality of pulse signals coupled as inputs to the exclusive OR circuit, each of the pulse circuits receiving a different clock as an input signal.

13. The random number generator as recited in claim 4 further comprising a digital to analog converter coupled to received outputs from the linear feedback shift register and the exclusive OR circuit, convert them to analog signals and supply the analog signals as the control input to the oscillator.

14. The random number generator as recited in claim 1 wherein the oscillator is free running and not initialized at startup.

15. The random number generator as recited in claim 1 wherein at initial power up, phase of the oscillator output signal is random with respect to the sample clock and wherein the phase of the oscillator output signal is dependent upon on all past history of oscillator state, starting from initial power up, thereby further contributing to the oscillator output signal being unpredictably random, with respect to the sample clock.

16. A random number generator comprising:
   an oscillator supplying an oscillator output signal having a frequency determined according to a control input;
   a sampling circuit coupled to the oscillator to sample the oscillator output signal, using a sample clock at a sampling frequency that is asynchronous to and lower than the frequency of the oscillator output signal;
   a distilling circuit coupled to receive the output of the sampling circuit and generate an N bit output therefrom; and
   wherein the control input is coupled to cause the oscillator output frequency to change significantly within each sample period of the sample clock.

17. The random number generator as recited in claim 16 wherein the distilling circuit is a cyclic redundancy check (CRC) circuit.

18. The random number generator as recited in claim 16 wherein the distilling circuit is a linear feedback shift register.

19. The random number generator as recited in claim 16 wherein the distilling circuit is coupled to shift in a number of bits from the sampling circuit greater than the number of output bits of the distilling circuit before providing a valid output available outside of the random number generator.

20. The random number generator as recited in claim 16 wherein the number of bits shifted into the distilling circuit is randomized within a predetermined range.

21. The random number generator as recited in claim 20 wherein the number of bits shifted into the distilling circuit are randomized by shifting in N bits plus an output of a linear feedback shift register.

22. The random number generator as recited in claim 16 further comprising a linear feedback shift register coupled to provide a serial output coupled to selectively enable shifting into the distilling circuit according to the serial output.

23. The random number generator as recited in claim 3 wherein a clock used to clock the linear feedback shift register is asynchronous to the sampling frequency.

24. The random number generator as recited in claim 3 wherein a clock used to clock linear feedback shift register operates at a frequency different from the sampling frequency.

25. The random number generator as recited in claim 3 wherein a clock used to clock the linear feedback shift register operates at a frequency relatively prime with respect to the period of the sampling frequency.

26. The random number generator as recited in claim 3 wherein a clock used to clock linear feedback shift register is a periodic waveform modified to be aperiodic by an external event.

27. The random number generator as recited in claim 26 wherein the external event causes an extra clock to be provided to the linear feedback shift register.

28. The random number generator as recited in claim 26 wherein the external event is a keystroke on a keyboard.

29. The random number generator as recited in claim 13 further comprising a filter providing a combined transient response time of the digital to analog converter and the VCO to be approximately a period of the sampling frequency.

30. The random number generator as recited in claim 3 further comprising a ring oscillator coupled the linear feedback shift register.

31. The random number generator as recited in claim 3 further comprising a plurality of ring oscillators, each ring oscillator having a different frequency and independent and being coupled to respective registers of the linear feedback shift register.

32. The random number generator as recited in claim 31 further comprising a plurality of exclusive OR gates coupled to receive respective outputs of the ring oscillators, the output of the exclusive OR gates being coupled to respective inputs of the respective registers of the linear feedback shift register.

33. A method of generating a random number comprising:
   supplying an oscillator output signal having a frequency determined according to a control input;
   sampling the oscillator output signal in a sampling circuit using a sampling clock at a sampling frequency lower than and asynchronous to the frequency of the oscillator output signal and supplying a sampled output signal indicative thereof,
   changing the oscillator output frequency significantly during each sampling interval using the control input;
   shifting the sampled output signal into a linear feedback shift register;
   generating pseudo random numbers in the linear feedback shift register; and
   generating the control input using the pseudo random numbers.

34. The method as recited in claim 33 further comprising:
   supplying the sampling clock as the most significant bit used in generating the control input, thereby causing the oscillator output frequency to change significantly during each sampling interval.

35. The method as recited in claim 33 further comprising:
   providing the outputs from the linear feedback shift register to a digital to analog converter and supplying an analog output from the digital to analog converter as the control input to the oscillator.

36. The method as recited in claim 33 wherein generating the control input further includes logically combining one of the outputs of the linear feedback shift register in an exclusive OR circuit and providing an output from the exclusive OR circuit to generate, at least in part, the control input.

37. The method as recited in claim 33 wherein the output from the exclusive OR circuit is the most significant bit used to generate the control input.

38. A method of generating a random number comprising:
   supplying an oscillator output signal having a frequency determined according to a control input;
   sampling the oscillator output signal in a sampling circuit using a sampling clock at a sampling frequency lower than and asynchronous to the frequency of the oscillator output signal and supplying a sampled output signal indicative thereof;
   changing the oscillator output frequency significantly during each sampling interval using the control input; and shifting successive outputs from the sampling circuit into a distilling circuit to generate an N bit random number.

39. The method as recited in claim 38 wherein the distilling circuit is a cyclic redundancy check circuit.

40. The method as recited in claim 38 wherein more than N successive samples are shifted into the distilling circuit to generate the N bit random number.

41. The method as recited in claim 38 further comprising generating a signal indicating when the N-bit random number is valid.

42. The method as recited in claim 38 wherein a random number of samples between a lower bound and an upper bound are shifted into the distilling circuit from the sampling circuit.

43. The method as recited in claim 33 further comprising modifying a clock, which is a periodic waveform used to clock the linear feedback shift register, to be aperiodic by an external event.

44. A random number generator comprising:
   an oscillator supplying an output signal;
   means for sampling the output signal and supplying a sample signal indicative thereof;
   means for changing oscillator output frequency significantly during each sampling period; and
   means for distilling successive sample signals.

45. The random number generator as recited in claim 44 further comprising means for randomly controlling the output frequency of the oscillator.

* * * * *